2,979,909
SLUICE GATE

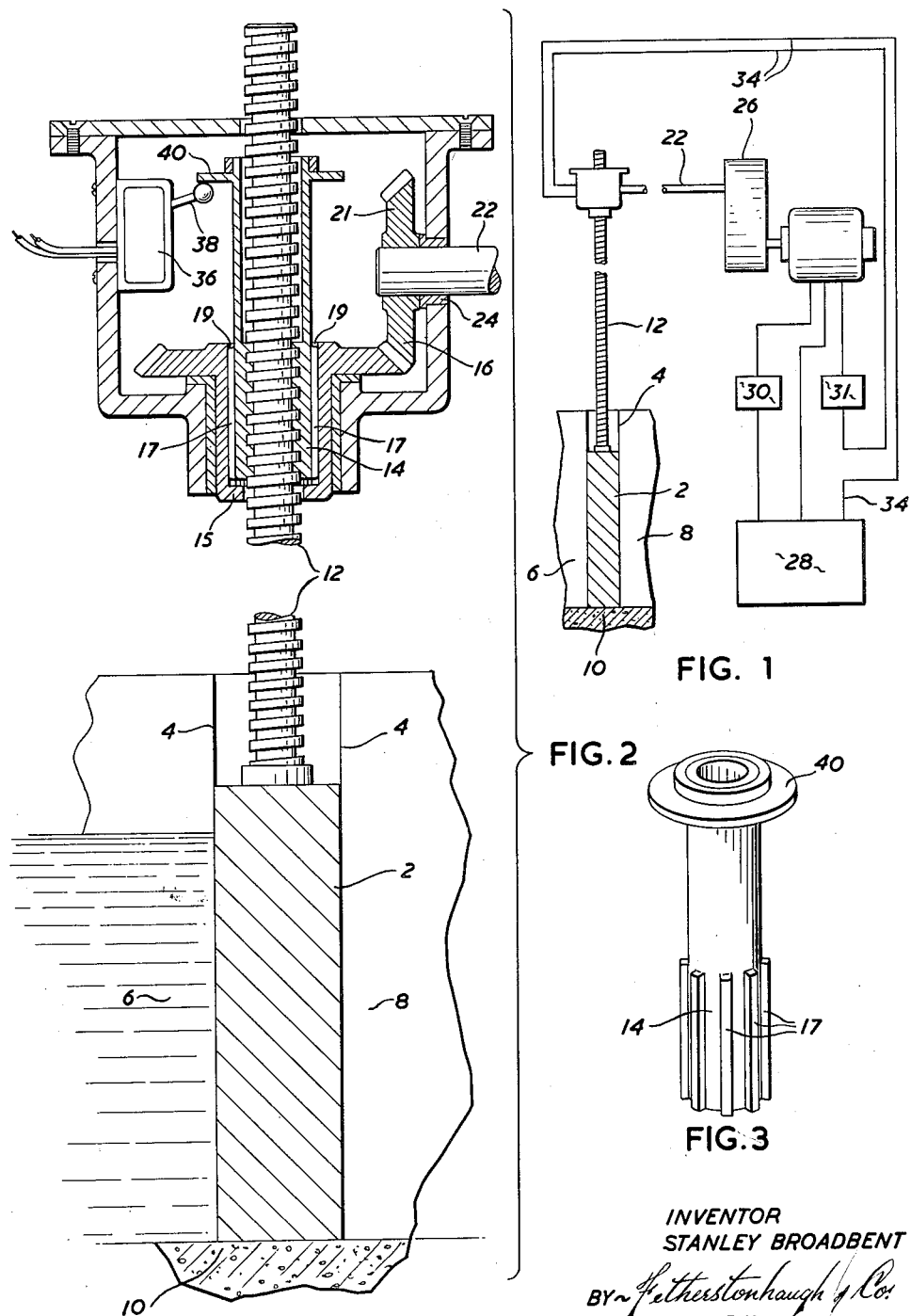

Stanley Broadbent, Metchosin, British Columbia, Canada, assignor to Yarrows Limited, Victoria, British Columbia, Canada Filed Jan. 2, 1959, Ser. No. 784,500

1 Claim. (Cl. 61—28)

This invention relates to a device to assist in the operation of raising and lowering sluice gates and particularly to a device for protecting the screw-operated spindles on power operated lift sluice gates from operating damage.

The sluice gates hang by gravity from spindles which are spirally threaded near their upper ends. A rotary element is threaded to each spindle and thrust-mounted to support the sluice gate and its associated mechanism. Rotation of the rotary element in one direction thus raises the gates against gravity and in the other direction lowers the gates under gravity. In present power operated arrangements, the rotary element is not movable vertically from its thrust mounted position. Thus the jamming of a rock or other obstacle in the downward path of a sluice gate would cause a compressive or buckling stress on the spindle due to the power applied by the rotary element. A similar compressive or buckling stress is encountered on downward movement of the sluice gates if the normal limit switch fails to disconnect the power source before the sluice gate contacts the sill which limits its downward travel.

This compressive or buckling stress may result in buckling of the spindles or alternatively in the necessity of designing strong and heavy spindles to stand such compressive stress.

Applicant has found that he can avoid such stresses by providing a rotary element which, although it is thrust mounted to support the weight of the gate and associated elements, may move up the spindle relative to its thrust mounting and by providing a switching mechanism operated by such upward movement to disconnect the power supply. Thus if the downwardly moving sluice gate contacts an obstacle halting such movement, or if it strikes the sill without the normal limit switch operating, the obstacle or sill then supports the sluice gate and the rotary element under continuing power rotation rises up the spindle until the switching mechanism is actuated to discontinue the application of power.

With the inventive mechanism no compressive stress can be applied to the spindles which therefore, need only be designed for their normal, tensile or torsional stresses.

In the drawings which illustrate embodiments of the invention:

Figure 1 shows a schematic view of the sluice gate and control;

Figure 2 shows in detail the sluice gate operating mechanism; and

Figure 3 shows a detail of the mechanism.

In the drawings are shown: a sluice gate 2, movable vertical guide ways 4 to allow controlled flow from the upside stream of the dam 6 to the downstream side 8 between the lower edge of the sluice gate 2 and a sill 10.

A spindle 12 is non-rotatably mounted on the gate 2 and extends upwardly therefrom to a control and suspension location, the connection between spindle 12 and gate 2 being such that the spindle may support the sluice gate thereby.

The spindle 12 is spirally threaded at the control mechanism and is contained in a complementarily threaded nut or rotary member 14. The nut 14 is adapted to seat on shoulder flanges 15 on the rotary gear 16 which in turn is seated on shoulders 18 of the suspension mounting 20. Thus it will be seen that when the nut 14 is seated on flanges 15 of gear 16 and the spindle is suspending the sluice gate, the flanges 15 act as a thrust bearing maintaining nut 14 at a predetermined level and support the sluice gate spindle and nut. The gear 16 surrounds the nut and is connected thereto by vertical keys or splines 17 in one member and complementary grooves 19 in the other.

Means are provided for rotating the gear such as by providing that the gear 16 is bevelled to mesh with a correspondingly bevelled gear 21 mounted on horizontal shaft 22; the shaft 22 is mounted on bearing 24 and connected to a rotary power source 26.

The rotary power source driven in any desired manner is preferably electrically controlled to start and stop and to determine the direction of rotation by a control console schematically shown at 28. Additional control is supplied by limit switches schematically shown at 30 and 31 for respectively disconnecting the rotary power at the upper and lower limits of rotary movement. The operation of the limit switch 31, therefore, is designed to disconnect the rotary power at a time when the lower edge of the downwardly moving sluice gate 2 has just contacted the sill 10.

A control circuit 34 which, when closed, causes downward movement of the sluice gate, is also completed through the power circuit of a normally open relay 36 mounted near the upper end of the spindle 12. The switch arm 38 of the relay 36 extends generally horizontally and is contacted by an arm 40 extending from and attached to the nut 14. The arrangement is such that when the nut 14 is seated on flanges 15 the arm 14 maintains the relay 32 closed; the electrical circuit 34 for lowering the sluice gates is maintained closed subject to the operation of the control console 28. However, when the nut 14 rises above the flanges 15 a predetermined amount, the relay switch arm 38 rises under the intrinsic relay bias to open the control circuit so that gears 16 and 21 are no longer rotated by the power supply and compressive stress on the spindle is avoided.

The operation of the device is as follows. To lower the sluice gate the control console 28 is operated to cause the power source to rotate shaft 22, gear 21 and gear 16 in such a direction that the spindle and sluice gate 2 are lowered. If the sluice gate 2 should strike a rock or other obstacle, then its downward motion is halted, while rotation of gear 16 and nut 14 continues. Continued rotation of the nut 14 by the gear 16 causes it to rise on the spindle 12 away from flanges 15 with the splines 17 moving in grooves 19. Such movement causes arm 40 and switch arm 38 to rise relative to relay 32 and when the movement has covered a predetermined distance, opens the power circuit of the relay 36 and thus opens control circuit 34 causing the power source to cease operation. In this way all compressive stresses on the spindle 12 are avoided.

A similar operation will take place if the sluice gate should strike the sill 10 before the normal limit switch 31 stops the downward movement of the sluice gate.

It will be seen that movement of nut 14 upwardly on the spindle does not interfere with the subsequent operation of the controls for raising the sluice gate. If, when the nut 14 is displaced from flanges 15, the control console is operated to close a sluice gate, then the rotation of gear 16 first screws the nut 14 downward on the spindle 12 until it contacts the flanges 15 and seats on them. Further the rotation of the gear 16 then actuates the nut 14 to raise sluice gate 2 by spindle 12. As the nut 14 moves downward on the spindle 12, the relay arm will simultaneously move down to close the power circuit of relay 32 and close the circuit 34 for any subsequent lowering operation. One spindle 12 and corresponding raising and lowering apparatus are shown for the sluice gate 2. It will be understood that as many spindles and associated apparatus may be used as are necessary for a particular sluice gate without departing from the spirit of the invention.

Although in the disclosure made herein an electric drive is shown for the sluice gates, it will be understood that the inventive principle may be used with other sources of power for raising and lowering the gates. Such sources of power may be hydraulic or diesel operated or by any known means with a suitable control system controlled by the conventional limit switches and also by a switch 36 or equivalent operated by the nut 14 as heretofore described.

I claim:

A sluice gate and control therefor comprising: a sluice gate; at least one shank having a threaded portion attached to and extending upwardly from a sluice gate; a body threaded to said shank adapted to support the weight of the shank and sluice gate; first means for limiting downward movement of said body at a predetermined level, said means being adapted to support said body, shank, and sluice gate; said body being arranged to rest on said support when supporting the weight of said shank and sluice gate; second means, keyed to and vertically slidable relative to said body for rotating said body in either direction, whereby said body rotating in one direction will raise said sluice gate while supported by said first means and said body rotating in the other direction will, while supporting said sluice gate, lower said sluice gate under gravity, said body being movable upwardly relative to said level and support, whereby interference with the downward motion of said sluice gate while said body is being rotated in said other direction will cause said body to move upwardly on said shank relative to said level, third means for stopping the operation of said second means on a predetermined amount of such upward movement.

References Cited in the file of this patent

UNITED STATES PATENTS

| | | |
|---|---|---|
| 764,189 | Hardy | July 5, 1904 |
| 1,224,652 | Kocourek | May 1, 1917 |
| 1,366,402 | McDougall | Jan. 25, 1921 |
| 1,514,120 | Alters | Nov. 4, 1924 |
| 2,361,439 | Weiss | Oct. 31, 1944 |

FOREIGN PATENTS

| | | |
|---|---|---|
| 2726A | Great Britain | Aug. 7, 1906 |